United States Patent [19] — Steiman

[11] 3,934,763

[45] Jan. 27, 1976

[54] HAND-HELD DISPENSER PUMP CONSTRUCTION

[75] Inventor: Wolf Steiman, Bridgeport, Conn.

[73] Assignee: VCA Corporation, Greenwich, Conn.

[22] Filed: June 3, 1974

[21] Appl. No.: 476,039

[52] U.S. Cl. .......... 222/321

[51] Int. Cl.$^2$ .......... G01F 11/02

[58] Field of Search .......... 222/321, 320

[56] References Cited

UNITED STATES PATENTS

| | | | |
|---|---|---|---|
| 2,117,296 | 5/1938 | Cahoon | 222/321 |
| 2,729,506 | 1/1956 | Ziherl et al. | 222/321 |
| 2,889,964 | 6/1959 | Cooprider | 222/321 |
| 3,120,906 | 2/1964 | Harnage | 222/321 |
| 3,282,472 | 11/1966 | Roder | 222/321 |
| 3,298,573 | 1/1967 | Smalley | 222/321 X |
| 3,337,096 | 8/1967 | Brown | 222/321 X |

*Primary Examiner*—Stanley H. Tollberg
*Assistant Examiner*—Hadd Lane
*Attorney, Agent, or Firm*—H. Gibner Lehmann; K. Gibner Lehmann; E. Donald Mays

[57] ABSTRACT

A small hand-held dispenser of the pump variety, comprising an aerosol-type can and a cooperable dispenser pump construction adapted to be carried by the can. The pump per se is snap-fitted into a unique plastic closure which is in the form of an inverted, dish-shaped member that in turn is assembled to the can by a snap assembly operation. The plastic closure has relatively thin walls enabling it to be readily molded, and has a depending peripheral flange which is forced over the top curled rim of the can so as to effect a snap fit therewith. The plastic closure not only securely mounts the pump assemblage on the can, but also effects a leak-proof connection therewith while at the same time simplifying the assembly operations and tooling.

6 Claims, 4 Drawing Figures

HAND-HELD DISPENSER PUMP CONSTRUCTION

BACKGROUND

This invention relates to small hand-held dispensers involving pump assemblages, as distinguished from pressurized aerosol containers and valves. In the past there was proposed a press-fit closure assemblage for a pressurized aerosol container, as described and claimed in U.S. Pat. No. 2,957,611 issued to Philip H. Sagarin on Oct. 25, 1960. The plastic closure member disclosed therein was characterized by very thick walls whereby there was entailed a relatively long curing time and therefore a lengthy molding cycle. Moreover, the tendency for the plastic material to shrink with aging meant the possibility of pressure leakage of the contents of the can during shipping or after a lengthy period of shelf storage. To my knowledge no previous constructions have been proposed for economically assembling a pumping unit to an aerosol-type can of the kind capable of containing pressurized product, such as that normally sealed by a crimped closure as distinguished from screw threads. Prior pump-type dispensers generally utilized threaded caps, and plastic or glass containers having cooperable threaded necks. These dispensers had the disadvantage of high cost of the screw threads as well as the relatively complex assembly machinery for attaching the screw caps and pumps to the threaded container necks.

SUMMARY

The above disadvantages and drawbacks of prior pressurized dispensers, and of prior pump or snap-closure type dispensers are obviated by the present invention, which has for its main object the provision of an improved, simplified pump-variety dispenser utilizing an aerosol-type can wherein a quick and easy assembly of the components is had without the likelihood of leakage occurring at a later time, either during storage and shipping or when in use. A related object of the invention is the provision of an improved pump-type dispenser as above set forth, which can be economically produced at a minimum cost with respect to components and assembly.

The above objects are accomplished by a novel snap-on type plastic closure member which is so constituted as to enable it to be assembled to a pump unit by a simple snap fit assembly, and thereafter assembled to an aerosol-type can by a second snap-on operation. The plastic closure member is in the form of an inverted, dish-shaped molding having a depending peripheral flange with undercuts or grooves in its inner walls. One undercut receives a flat, external mounting flange of the pump cylinder member with a snap fit, and another undercut receives the rounded or curled top rim of an aerosol-type can, also with a snap fit. No screw threads whatsoever are involved in the fabrication or assembly of the parts. The plastic cover overlies and fits around the curled rim of the aerosol can in such a manner that any shrinkage of the plastic will result in a tighter gripping and sealing of the closure whereby there is minimized the likelihood of leakage of product from the can and/or looseness of the pump assemblage. Other features and advantages will hereinafter appear.

Figure 1:
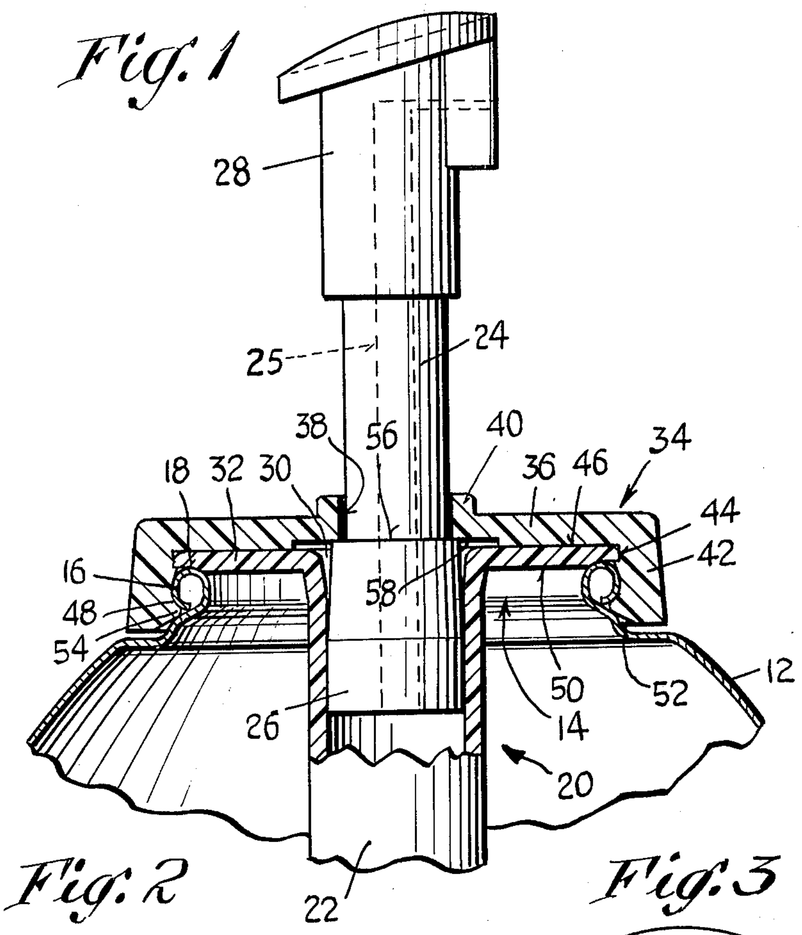
FIG. 1 is a fragmentary axial view partly in side elevation and partly in section, of a hand-held dispenser construction of the pump-type, utilizing the present invention.
Figure 2:
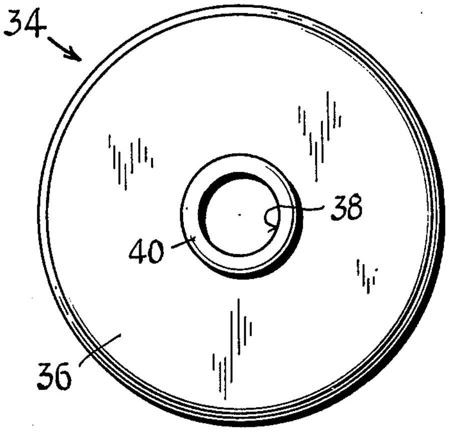
FIG. 2 is a top plan view of the snap-type plastic closure employed with the construction of FIG. 1.
Figure 3:
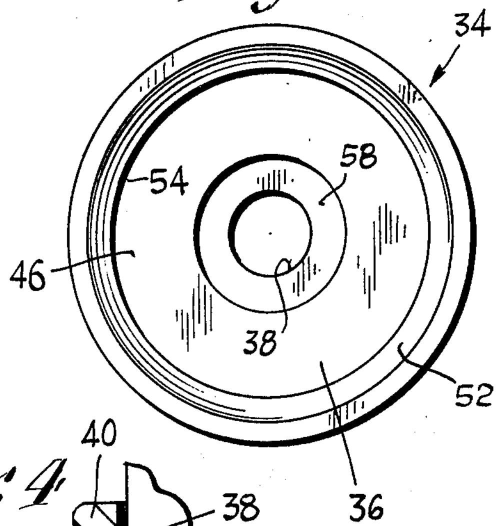
FIG. 3 is a bottom plan view of the snap-on plastic closure.
Figure 4:
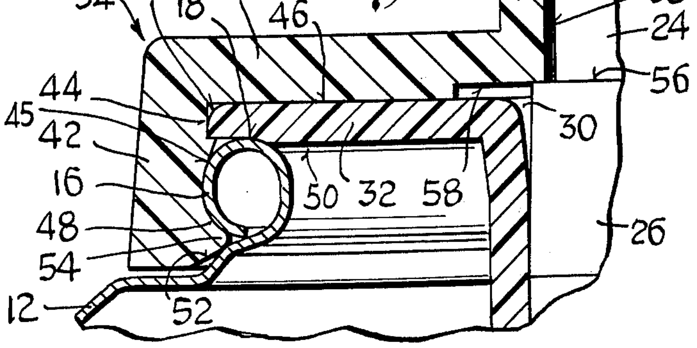
FIG. 4 is an enlarged fragmentary view of the dispenser construction of FIG. 1.

As shown, the present improved pump-type dispenser construction comprises an aerosol-type can including a crowned top portion 12 surrounding a top opening 14. The top portion 12 has an out-turned curl 16 forming an annular rounded bead 18 which constitutes the top rim of the can. Disposed in the top opening 14 is a pump assemblage designated generally by the numeral 20, such assemblage comprising a pump cylinder 22 and a cooperable hollow plunger 24 carried thereby, said plunger including a piston 26 of usual construction, and having a central passage indicated at 25.

Mounted on the upper extremity of the plunger 24 is an orificed depress button 28, also of usual construction.

The pump cylinder 22, plunger 24 and button 28 are all preferably molded of suitable plastic substance, and the cylinder 22 has at its mouth 30 an annular, outwardly-extending, flat mounting flange 32. The pump cylinder 22 can have the usual dip tube (not shown) which extends to the bottom of the container or can, all as is well understood.

In accordance with the present invention there is provided a unique snap-on plastic closure in the form of an inverted, dish-shaped member 34 having a disk-like body 36 provided with a central opening 38 through which the plunger 24 of the pump assemblage extends and in which it is reciprocatable. The body 36 has an upstanding annular flange or collar 40 defining the opening 38 and providing a larger bearing surface for the plunger or shank 24.

The collar 40 reinforces and strengthens the body 36, which is important since the body constitutes a stop for the plunger 24 as will be later brought out.

The closure member 34 includes a depending peripheral flange 42 which has an annular undercut 44 closely adjacent the disk-like body 36 and adapted to receive and hold captive by a snap-fit assembly the mounting flange 32 of the pump cylinder 22. In accomplishing the assembly of the pump cylinder to the dish-shaped member, the inner wall portion of the peripheral flange 42 has a substantially conical, annular camming face 45 immediately adjacent the undercut 44, the face 45 camming outwardly the peripheral flange 42 when the mounting flange 32 is snapped into the dish-shaped member. In addition, there is provided on the periphery of the mounting flange 32 a cooperable annular camming face 47 of rounded configuration, adapted to engage and snap past the camming face 45 during assembly. By such an arrangement, the parts can be snapped together with a minimum of time and effort. The sharp nature of the undercut 44 insures that the two parts will not become separated following the snap operation. Preferably, as shown, the mounting flange 32 is positioned in the undercut 44 so as to be engaged by major portions or areas of side 46 of the disk-like body 36. For maximum strength and ruggedness, I have found that the diameters of the pump mounting flange 32 and diskshaped member 36 are preferably on the order of three times the diameter of the pump cylinder 22.

The peripheral flange 42 also has in its inside wall a shallow annular groove 48 which is adapted to receive the out-turned curl 16 of the can when the closure 34 is snapped over the top opening 14 thereof. The bead 18 formed by the curl 16 engages the underside 50 of the mounting flange 32 of the pump cylinder, and thereby supplements the holding action of the undercut 44 on the mounting flange 32. The dimensions of the various parts are so proportioned that, due to groove 48 being of slightly lesser extent that the curl 16, the plastic closure 34 permanently, forcibly engages the curl 16 after its assemblage thereto. The depending flange 42 of the closure has a sloped annular surface 52 at its bottom rim portion, which provides a mouth or entrance for the curl 16, camming outward and expanding radially and circumferentially the flange during the snap-on assembly operation. The flange 42 has in its inner wall an annular rib or bead 54 providing the sloping mouth surface 52. Such bead snaps under the curl 16 during the assembly operation, with the result that the closure 34 is securely retained on the can 10 and normally resists all stresses which might be exerted against it, tending to remove it from the can. The rib 54 also holds the bead 18 of the can tightly against the underside 50 of the pump mounting flange 32, whereby there is eliminated all looseness and tendency for leakage of liquid at the curl and bead.

The natural tendency for the plastic substance of which the closure 34 is molded, to shrink or reduce its dimensions results in the closure being held securely on the can, and in all leakage being prevented at the joint formed with the bead 18.

It will be readily observed that the closure 34 has relatively thin wall sections which permit of a rapid curing time during the molding process and provide for desirable uniformity in the molded product, as regards stability and dimensions. The depending flange 42 is made thicker at its bottom rim or edge, to increase its strength and reduce the likelihood of breakage.

The closure 34 is assembled to the pump 20 prior to the attachment of the button 28 to the plunger 24. The shank of the plunger is passed through the opening 38 of the closure 34 and the mounting flange 32 of the pump cylinder 22 forcibly press-fitted into the closure. Thereafter the button 28 can be applied to the plunger 24. The can or container 10 is filled with the liquid product to be dispensed, after which the assembly of pump and closure is applied to the can by snapping the closure onto the curl and bead 16, 18 of the can. The above assembly operations are carried out quickly and without difficulty, and help to reduce the cost of the dispenser while at the same time resulting in a quality product having an attractive appearance.

The plunger 24 is provided with a stop shoulder 56 which is engageable with the undersurface 58 of the closure 34 to limit the outward travel of the plunger. The collar 40 of the closure provides a desirable reinforcement, in connection with this stop function.

Variations and modifications are possible without departing from the spirit of the invention.

I claim:

1. A hand-held dispenser pump construction comprising, in combination:

a. an aerosol-type can including a crowned top portion surrounding a top opening, said top portion having an outturned curl forming an annular rounded bead constituting the top rim of the can;

b. a plastic pump cylinder and protruding plunger carried thereby, said cylinder at its mouth having an integral, annular, outwardly extending mounting flange supported adjacent its periphery on the top rim of the can;

c. a one-piece, snap-on plastic closure member comprising an inverted, dish-shaped member having a flat disk-like body provided with a central opening through which the plunger extends and in which it is reciprocatable;

d. said closure member including an integral depending peripheral flange having an annular undercut closely adjacent the disk-like body for receiving and holding captive the mounting flange of the pump cylinder whereby the upper side of said mounting flange is directly engaged by the underside of the disk-like body; and e. said peripheral flange having in its inside wall a shallow annular groove of slightly less axial extent than said curl and immediately adjacent said annular undercut adapted to receive the outer wall portion of the outturned curl of the can when the closure is snapped over the top opening thereof; whereby f. said top rim of the curl directly, sealingly engages the underside of the mounting flange of the pump cylinder adjacent its periphery to provide a leak-resistant seal without the use of any sealing gasket or washer.

2. A dispenser pump construction as in claim 1, wherein:

a. the pump plunger has an annular stop shoulder surrounding the central passage thereof and normally engaging the underside of the dish-shaped member, b. said dish-shaped member thereby constituting a stop to limit the outward movement of the plunger.

3. A dispenser pump construction as in claim 1, wherein:

a. the depending peripheral flange of the dish-shaped member is thickened at its bottom rim to increase its strength and reduce the likelihood of breakage.

4. A dispenser pump construction as in claim 1, wherein:

a. the depending peripheral flange of the dish-shaped member has a camming surface at its bottom rim to facilitate snapping of the rim over the curl of the can top portion during assembly.

5. A dispenser pump construction as in claim 1, wherein:

a. said depending peripheral flange has a substantially conical, annular camming face adjacent the undercut to facilitate snapping of the mounting flange of the pump cylinder into the dish-shaped member.

6. A dispenser pump construction as in claim 5, wherein:

a. the mounting flange of the pump cylinder has a cooperable annular camming face of rounded configuration adapted to engage and snap past the first-mentioned camming face during the assembly of the mounting flange of the pump cylinder to the dish-shaped member.

* * * * *